(12) United States Patent
Bollich

(10) Patent No.: US 6,167,797 B1
(45) Date of Patent: Jan. 2, 2001

(54) PORTABLE COMMERCIAL BARBECUE COOKER

(76) Inventor: Gerald Bollich, 1360 Drew Ave., Eunice, LA (US) 70535

(*) Notice: Under 35 U.S.C. 154(b), the term of this patent shall be extended for 0 days.

(21) Appl. No.: 09/345,907

(22) Filed: Jul. 1, 1999

(51) Int. Cl.[7] .................................................. A47J 37/00
(52) U.S. Cl. .............................. 99/340; 99/467; 99/482; 99/448; 99/479
(58) Field of Search .............................. 99/339, 340, 341, 99/400, 401, 444–450, 467, 468, 476, 481, 482, 483, 485; 126/25 R, 9 R, 41 R, 25 B, 9 B; 312/236

(56) References Cited

U.S. PATENT DOCUMENTS

| | | |
|---|---|---|
| 3,561,348 * | 2/1971 | Weir, Sr. .............................. 99/446 X |
| 3,721,177 | 3/1973 | Booker . |
| 3,942,425 | 3/1976 | Canright . |
| 4,070,958 | 1/1978 | Canright . |
| 4,184,420 | 1/1980 | Podaras et al. . |
| 4,355,570 | 10/1982 | Martin et al. . |
| 4,418,615 | 12/1983 | Higgins . |
| 4,467,709 * | 8/1984 | Anstedt ................................ 99/482 |
| 4,512,249 * | 4/1985 | Mentzel ................................ 126/9 R |
| 4,643,163 | 2/1987 | Martinez . |
| 4,669,447 | 6/1987 | Kelly . |
| 4,957,039 * | 9/1990 | Reyes .................................... 99/340 |
| 4,962,696 * | 10/1990 | Gillis .................................... 99/448 X |
| 4,962,697 * | 10/1990 | Farrar .................................. 99/446 X |
| 5,168,796 * | 12/1992 | Porton et al. ...................... 126/41 R |
| 5,425,352 * | 6/1995 | Gillam et al. ...................... 126/25 R |
| 5,445,073 * | 8/1995 | Gilwood .............................. 99/450 X |
| 5,501,142 | 3/1996 | Bailey . |
| 5,515,774 | 5/1996 | Swisher et al. . |
| 5,531,154 * | 7/1996 | Perez, III ............................ 126/9 R |
| 5,662,959 | 9/1997 | Tippmann . |
| 5,768,977 * | 6/1998 | Parris et al. ........................ 99/340 |
| 5,813,321 | 9/1998 | Bourgeois . |
| 5,862,741 * | 1/1999 | Wodeslavsky ...................... 99/446 X |
| 5,910,209 * | 6/1999 | Lee ...................................... 99/450 |

* cited by examiner

Primary Examiner—Timothy F. Simone
(74) Attorney, Agent, or Firm—Robert N. Montgomery

(57) ABSTRACT

A transportable, commercial, barbecue cooking apparatus housed in an insulated, conventionally shaped building structure, the apparatus further including a vertical diametrical smoke chamber having an adjacent force draft heat chamber integral therewith, the smoke chamber fitted with sloped, horizontal screens attached to a rotating vertical shaft thereby providing increased visibility, efficient, circulation and improved rendering, the heat chamber being fired with a gas burner and utilizing hardwood saw dust to produce a heavy smoke which is force drafted through a duct into the cooking chamber. The cooker is further provided with onboard hot water tanks for cooking and cleanup and includes provisions for humidity and temperature control. Provisions are made for food boiling, frying and steam cooking capability and includes amenities such as a storage locker, internal oven lighting, smoke blow back fans, and view windows.

13 Claims, 3 Drawing Sheets

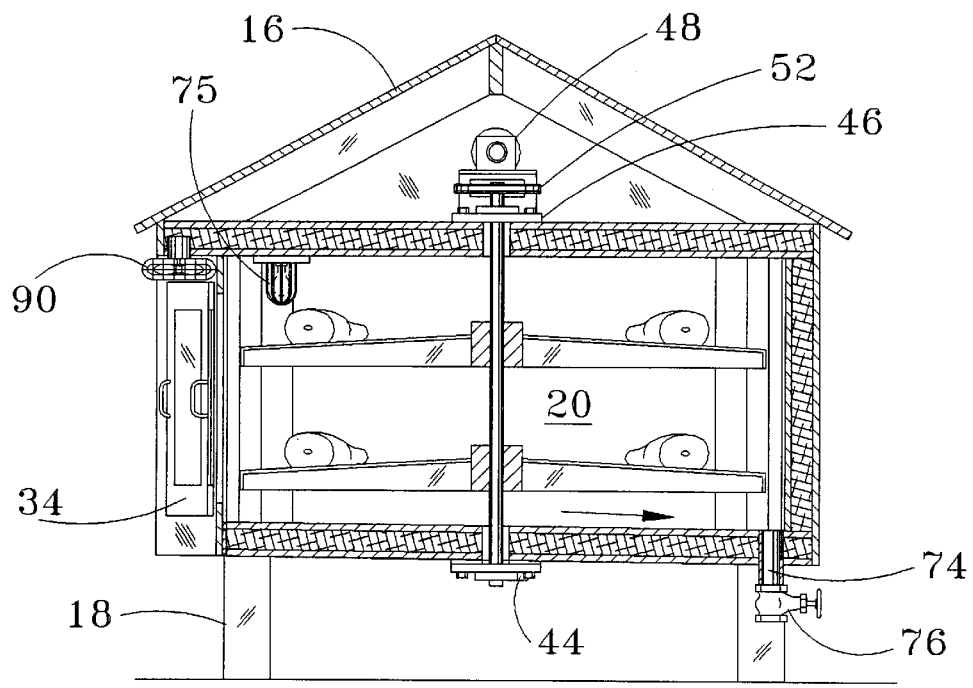
FIG. 4
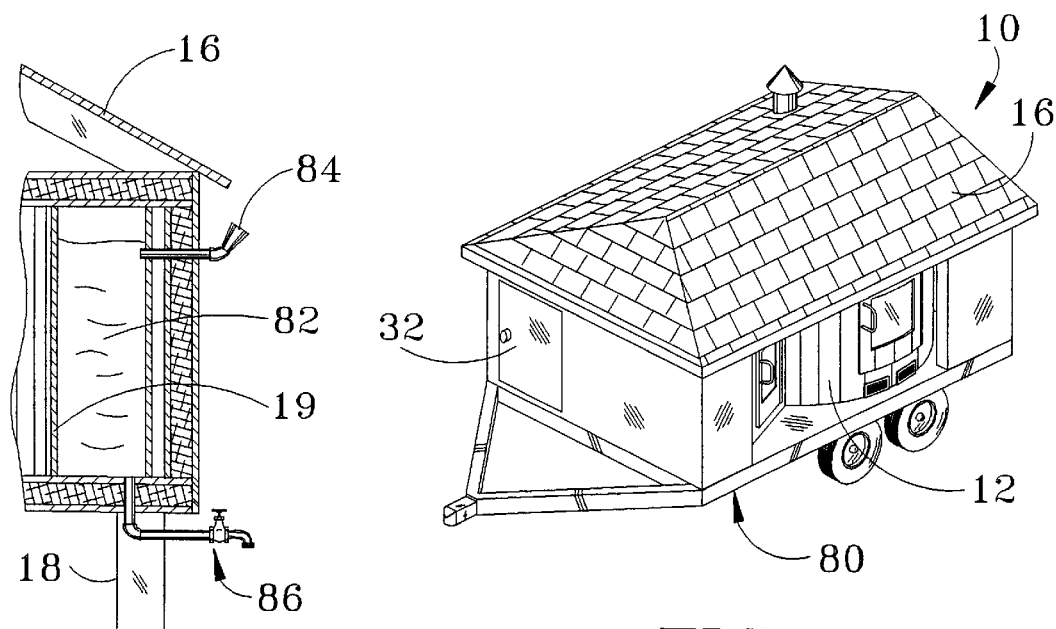
FIG. 5
FIG. 6

PORTABLE COMMERCIAL BARBECUE COOKER

BACKGROUND OF THE INVENTION

1. Field of the Invention

This invention relates generally to the art of outdoor cooking and more particularly to a self contained, portable, commercial, cooking apparatus for transport to a remote site and cooking of relative large quantities of meat by force drafting smoke and heat from a gas burner and smoke chamber into a smoking oven.

2. General Background

The commercial cooking of meat for large gatherings has seen wide acceptance in recent years. A caterer is called upon to provide the meat and other assorted food in large quantity for large numbers of people in an outdoor setting. Caterers often provide food cooked with their own trade secret recipes and methods. They usually provide their own cooking apparatus or one purchased for such purpose. Many of these commercial cooking apparatus are portable so they can be brought to the cookout site where the caterer cooks the meal. Such cooking apparatus vary in design from oversized backyard barbecue grills to very elaborate cooker/smokers.

It is well established within the art that meat can be simply roasted over a grill and cooked by the heat from hardwood or charcoal briquettes burning under the grill. The grease, sauce and drippings from the meat cooked on such grills fall directly into the fire causing irregularities in cooking temperatures and charring and burning of the meat. It is also theorized that the burning of such grease and drippings induces carcinogens and excess carbon back into the meat with the smoke. As a result, most regulations governing the commercial cooking of meat products require the meat to be cooked by the direct action of dry heat resulting from the burning of hardwood or hot coals therefrom in an indirect manner for a sufficient period of time to permit the meat to assume the usual characteristics of the smoked barbecued article and the rendering of surface fat. Regulations further require the weight of the barbecued meat not to exceed 70 percent of its fresh, uncooked weight.

With this in mind, portable, commercial systems for cooking relatively large quantities of meat should be constructed in a manner which at least meets nominal commercial requirements.

Some domestic cooking apparatus have been developed which avoid the difficulties discussed herein by conducting the hot gases from a hardwood fire into a cooking chamber where it is circulated before being exhausted. The excess renderings are then collected from the meat in pans disposed below the meat. Commercial cooking apparatus are also well known within the art. However, domestic types are too small and the commercial systems are too large for portability. The present invention overcomes the difficulties expressed herein as being inherent in the art, and provides an improved apparatus and method for cooking relatively large quantities of meat in a portable cooking apparatus which meets commercial requirements for cooking relatively large quantities of meet within a reasonable cooking time, produces consistent taste, even cooking, uses a minimum consumption of fuel, and contains all the amenities generally required by cookout caterers in a remote location all at a reasonable cost.

SUMMARY OF THE INVENTION

The invention disclosed herein is a trailerable, commercial, barbecue cooking apparatus housed in an insulated, conventionally shaped building structure. The cooker/smoker includes a vertical diametrical smoke chamber and an adjacent force draft heat chamber. The smoke chamber is fitted with sloped, horizontal screens attached to a rotating vertical shaft. The sloping screens provide increased visibility, efficient, circulation, and improved rendering. The heat chamber is fired with a gas burner and utilizes hardwood saw dust to produce a heavy smoke which is forced drafted through a duct into the cooking chamber. The cooker is provided with onboard hot water tanks for cooking and cleanup and further includes provisions for humidity and temperature control. Provisions are made for food boiling, frying and steam cooking capability. The system further includes amenities such as storage room, internal oven lighting, smoke blow back fans, and view windows.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 4 is a cross section view taken along sight lines 4—4 seen in FIG. 2;

FIG. 5 is a cross section view taken along sight lines 5—5 seen in FIG. 2; and

FIG. 6 is an isometric view of the smoke house seen in FIG. 3 mounted on a trailer.

DETAILED DESCRIPTION OF THE PREFERRED EMBODIMENT

Figure 1:
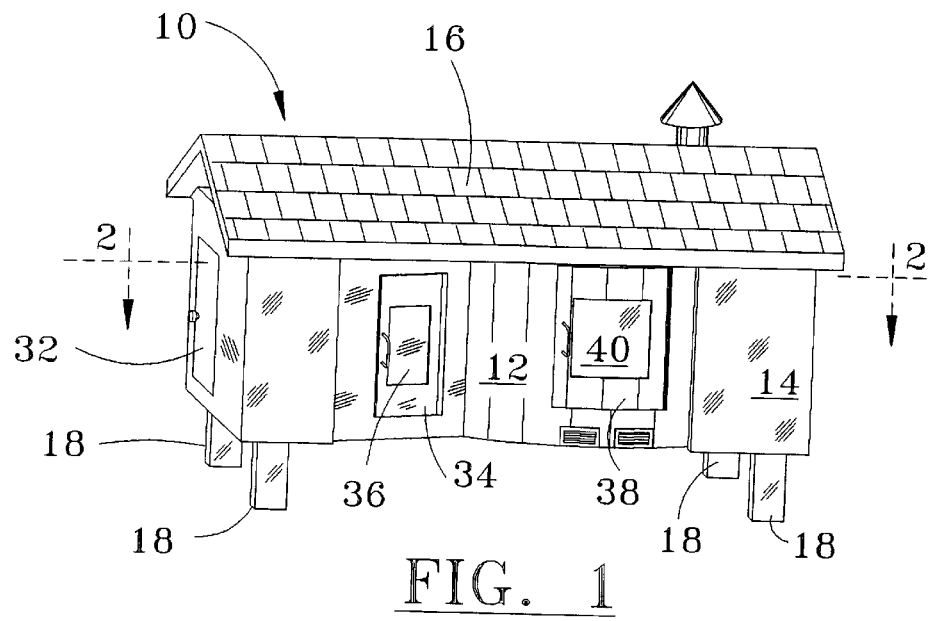
FIG. 1 is a vertical elevation view of the preferred smoke house embodiment.
Figure 2:
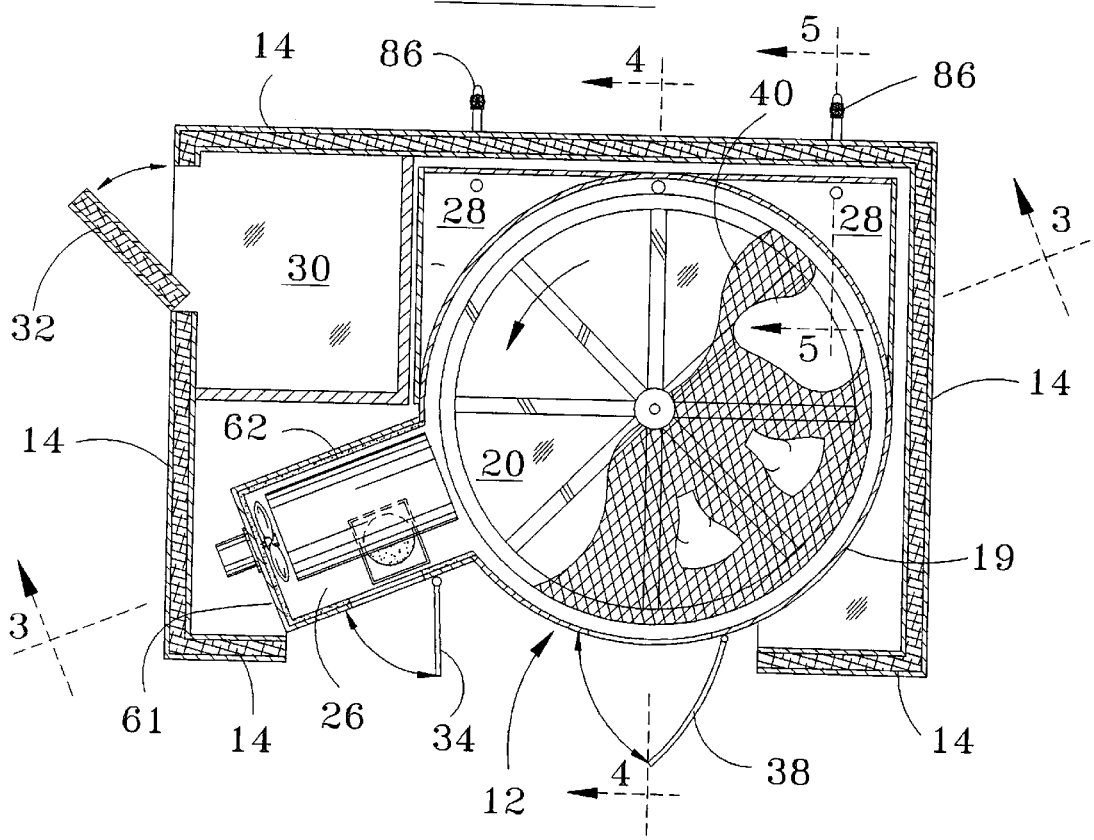
FIG. 2 is a cross section view taken along sight lines 2—2 seen in FIG. 1.

As seen in FIG. 1 the preferred embodiment of the convection oven-type smoker/cooker 12 is partially enclosed on three sides by insulated walls 14 and enclosed top and bottom by an insulated floor 13 and ceiling 15 and fitted with a roof 16. The smoker enclosure is generally a metal building structure having insulated interior. The roof and floor portions 22,24 of the cooker may only be insulated without providing an additional cover panel if desired. The cooker and structure is supported by adjustable legs 18. The smoker/cooker 12 and its insulated structure are configured to be self standing or be carried on a transport trailer 80 as seen in FIG. 6 As seen in FIG. 2, the smoker/cooker 12 is a continuous vertical wall approximately four foot high constructed of a relatively heavy metal plate 19 welded to form a rather large vertical, diametrical chamber 20 having a top 22 and bottom 24, best seen in FIG. 3. The diametrical chamber 20, being approximately seven and one-half feet, in diameter is common with a rectangular heat or combustion chamber 26 extending outwardly from the cooking chamber. Unique to such cookers is a pair of triangular shaped hot water tanks 28 formed as attachments to the exterior of the diametrical chamber 20. These tanks may be an integral part of the construction or simply attached to the cooker wall 19. In any case, the tank(s) should be constructed to provide sanitary water for cooking as well as washing.

Figure 3:
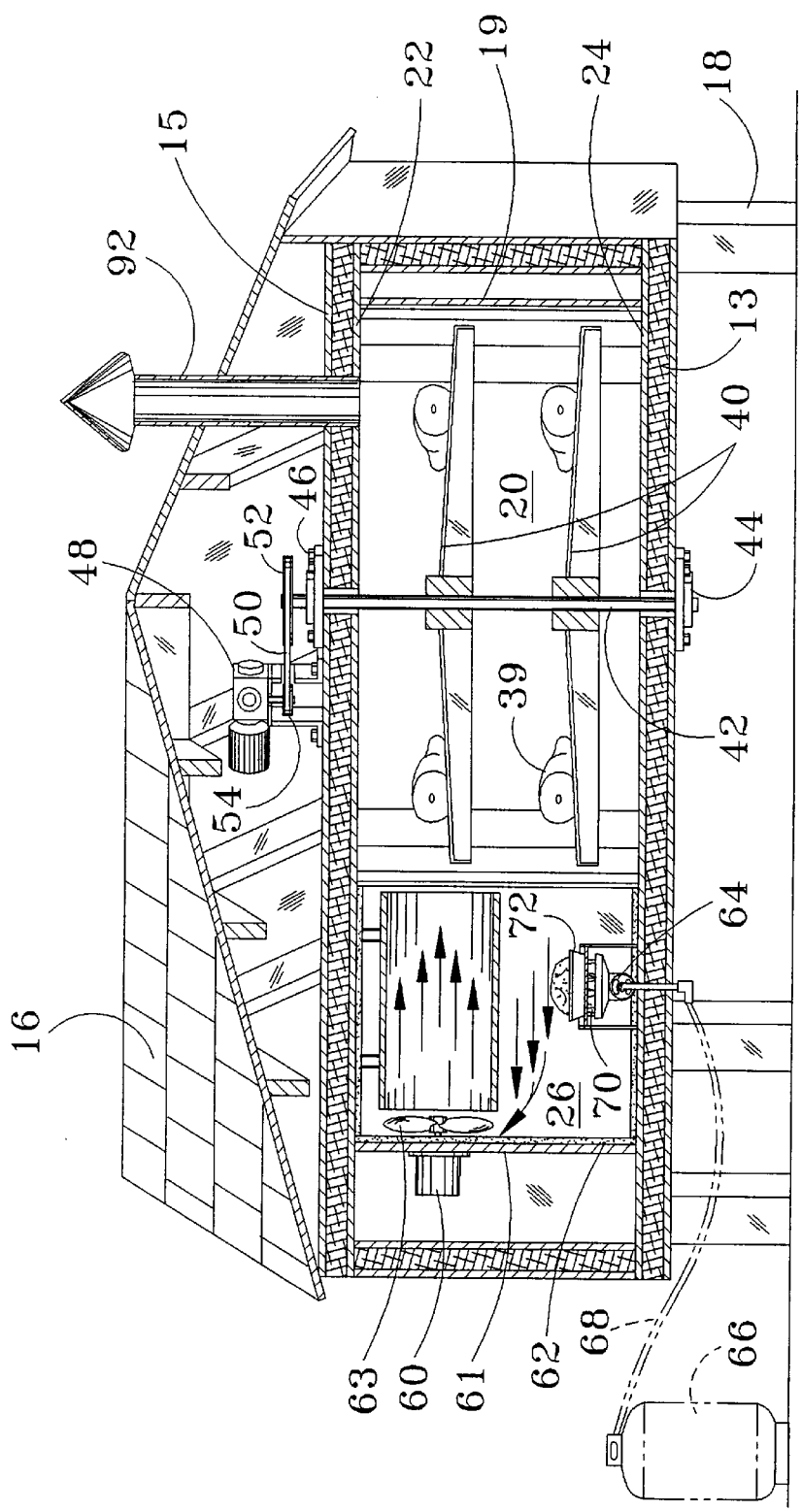
FIG. 3 is a cross section view taken along sight lines 3—3 seen in FIG. 2.

A storage compartment 30 is also provided within the confines of the insulated walls 14 with access provided to the storage compartment through a door 32 in the insulated wall 14. This compartment provides convenient storage for cooking supplies and utensils. Access to the burner chamber 26 is gained through a door 34 having a glass view panel 36 seen in FIG. 1. A similar door 38 is also provided with a glass viewing panel 40 in the diametrical smoke/cooking chamber 20. As seen in FIG. 3, the cooking chamber 20 is fitted with sloped, rotating screens used to support the food products 39 being cooked. The screens 40 are sloped downwardly from the central rotating column 42 centrally supported by an external lower bearing 44 and an external upper bearing 46. The screens are driven by the vertical column or shaft 42 connected to a drive gear motor 48 and a belt and pulleys 52,54 arrangement. In addition, the heat or burner chamber may be internally lined with a ceramic insulation 61 to isolate the heat inside the burner chamber from the metal sides of the chamber. This prevents heat from being transmitted to the building and isolates the user from high heat exposure except when the heat chamber door 34 is open. It should be noted that no partition wall separates the cooking chamber 20 from the burner or heat chamber 26. Therefore, ambient air being drawn through external vents in the cooker is mixed with heated air inside the cooker and drawn to the force draft fan 63 and circulated via the duct 62 into the cooking chamber 20. The fan blower motor 60 is through mounted externally on the chamber wall 61 with its fan blades 63 located internally and is directed towards the tubular duct 62. The duct is suspended within the heat chamber 26 in a manner whereby hot air produced by the gas burner 64, also located within the heat chamber 26, is also force drafted from the heat chamber 26 into the adjacent cooking chamber 20.

Gas is generally supplied to the gas burner 64 by a portable gas bottle 66 though a hose and various controls and connections 68.

A horizontal hot plate 70 is provided over the gas burner 64 located inside the heat chamber 26 for placing trays and pots containing water to produce moist humidified air to the cooking chamber and or for cooking other foods such as gumbo, sea food etc. A metal tray 72 is provided for holding and burning wood saw dust or briquettes as fuel to produce smoke.

As further seen in FIG. 4, the entire cooking chamber 20 is tilted slightly on its legs 18 towards a drain port 74 fitted with a valve 76. Therefore, all grease and debris from the cooking process can be washed to the drain port 74 and collected in a disposal tank. A light 75 is also provided within the cooking chamber 20 to provide visual inspection, through window 40, of the meat cooking process without opening the door 38.

Although the roof 16 shown in FIG. 4 is pitched to the side parallel with the trailer 80, the roof configuration may be varied, as seen in FIG. 6, to improve wind flow when mounted on the trailer 80. The trailer 80 may be positioned below the cooker 12 and the adjustable legs 18 lowered to allow the cooker and its insulated enclosure housing 13–15 (having a width not to exceed eight and one-half feet) to rest on the trailer in a manner suitable for transport.

Since the cooker is fully portable, insulated, stable, has portable heating gas, and the drive is low voltage thus allowing the meat screens to rotate, the cooking process may be started prior to transport and continue cooking in route.

The hot water 82 stored in tanks 28, seen in FIG. 5, is supplied through filler tubes 84 prior to transport or use and withdrawn through drain and spigot assembly 86. The water is heated by being exposed to the common wall 19 of the cooking chamber 20. Therefore, the water 82 is generally maintained at approximately 175–190 degrees Fahrenheit. The hot water 82 may be used for cooking foods in pots located in the heat chamber 26 on the burner plate 70, be used for washing down the interior of the cooking chamber 20 or dish washing and other general cleaning purposes. An open pot of boiling water may be maintained on the burner plate 70 during the cooking process to help control the humidity level within the cooking chamber 20 and prevent the meat from drying too fast.

A fan 90, seen in FIG. 4, is provided over each of the access doors 34,38 to exhaust smoke back into the chambers whenever the doors are opened.

In operation the burner 64 is ignited, the tray 70 is filled with saw dust and a pot of water is placed on the burner plate 70. Food to be cooked is placed on the rotatable screen shelves 40 and the force draft fan 60 is started. The saw dust begins to smoke and the smoke is drafted from the heat chamber 26 through the duct 62 into the cooking chamber 20 and vented to atmosphere through vent 92. If the rotating screens 40 become over loaded or unbalanced to an extent which overloads the drive motor 48, the belt is 50 is allowed to slip, thereby providing motor protection. Obviously, a damper (not shown) may be placed within the exhaust vent 92, if more control of the temperature in the cooker is or required to control the flow of heat and smoke being exhausted out of the cooking chamber.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A portable, meat cooker/smoker apparatus for the commercial cooking of relatively large quantities of meat at a remote site comprising:
    a) a continuous vertical wall forming a geometric shape having a diametrical portion and a rectangular projection extending outwardly from said diametrical portion;
    b) a plate consistent with said geometric shape enclosing each end of said wall forming a diametrical cooking chamber and a rectangular heat chamber therein having a ceiling and floor;
    c) a first door located in said wall accessing said cooking chamber; and
    d) a second door located in said wall accessing said heat chamber.

2. The portable, meat cooker/smoker apparatus according to claim 1 further comprising at least one hot water tank attached externally to said cooking chamber, said tank comprising an enclosed elongated tank having continuous walls forming a triangular shape, the hypotenuse of said triangular shape being consistent with exterior radius of said cooker chamber, the remaining right angle sides of said triangular shape being dimensioned to be tangent with exterior wall of said cooker chamber; a filler tube located in an upper portion of said tank; and a spigot located in the lower portion of said tank.

3. The portable, meat cooker/smoker apparatus according to claim 1 further comprising:
    a) a rotatable vertical column centrally located within said cooking chamber extending through said ceiling and floor;
    b) a bearing supporting said column mounted externally to said ceiling and floor;

c) a geared drive motor assembly coupled to said column by pulleys and belt, attached externally to said ceiling;

d) a plurality of diametrical screens attached to said column extending horizontally outwardly and sloping slightly downwardly from said column; and e) a light located within said cooking chamber adjacent said door.

4. The portable, meat cooker/smoker apparatus according to claim 3 further comprising a gas burner located within said heat chamber having a hot cooking plate mounted above said burner.

5. The portable, meat cooker/smoker apparatus according to claim 4 further comprising a fan and duct means suspended within an upper portion of said heat chamber above said burner in a manner wherein said fan draws heated air produced by said burner and force drafts said air directly into interior of said cooking chamber and horizontally across said screens.

6. The portable, meat cooker/smoker apparatus according to claim 5 further comprising a high temperature ceramic insulation liner covering interior of said wall within said heat chamber.

7. The portable, meat cooker/smoker apparatus according to claim 1 wherein said first and second doors further comprise thermal glass view panels.

8. The portable, meat cooker/smoker apparatus according to claim 4 further comprising a tray placed upon said hot cooking plate containing a smoke producing fuel.

9. The portable, meat cooker/smoker apparatus according to claim 4 further comprising a pot placed up on said hot cooking plate containing water which, when heated, produces steam for humidifying said cooking chamber.

10. The portable, meat cooker/smoker apparatus according to claim 1 further comprising a drain located in said floor having a valve means for discharging renderings from said cooking chamber into a container for disposal.

11. The portable, meat cooker/smoker apparatus according to claim 1 further comprising an insulated enclosure surrounding exterior of said ceiling and floor and at least three sides of said cooking and heat chamber.

12. The portable, meat cooker/smoker apparatus according to claim 11 wherein said insulated enclosure further comprises:

a) a plurality of adjustable support legs attached to said enclosure;

b) a storage locker located within said insulated enclosure adjacent said cooker chamber;

c) a door accessing said storage locker through an exterior portion of said insulated enclosure; and d) a roof structure attached to said insulated enclosure.

13. The portable, meat cooker/smoker apparatus according to claim 11 wherein said insulated enclosure further comprises an exhaust vent communicative with interior of said cooking chamber extending through said insulated enclosure and above said roof structure and a fan means located externally adjacent said door in said cooking chamber and said heat chamber for blowing smoke back into said chamber when either door is open.

* * * * *